UNITED STATES PATENT OFFICE.

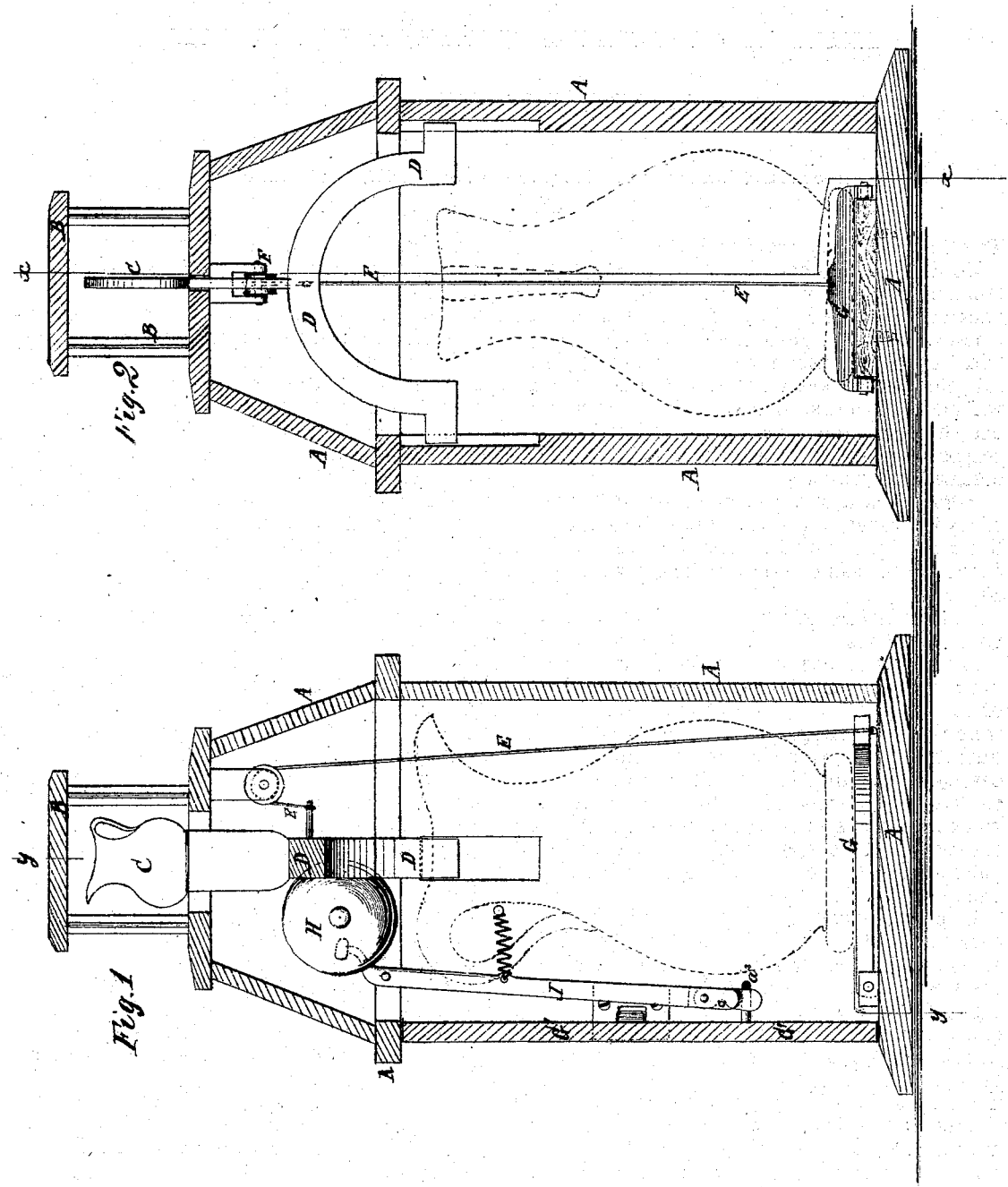

ELISHA BELCHER BLAKE, OF TARRYTOWN, NEW YORK.

IMPROVEMENT IN MILKMEN'S SIGNALS.

Specification forming part of Letters Patent No. 116,014, dated June 20, 1871.

*To all whom it may concern:*

Be it known that I, ELISHA BELCHER BLAKE, of Tarrytown, in the county of Westchester and State of New York, have invented a new and useful Improvement in Milk-House; and I do hereby declare that the following is a full, clear, and exact description thereof, which will enable others skilled in the art to make and use the same, reference being had to the accompanying drawing forming part of this specification, in which—

Figure 1 is a detail vertical sectional view of my improved milk-house taken through the line $x\,x$, Fig. 2; and Fig. 2 is a detail vertical section of the same taken through the line $y\,y$, Fig. 1.

Similar letters of reference indicate corresponding parts.

My invention has for its object to furnish an improved house or receptacle for the pitcher or other vessel in which the milk is received from the milkman to protect said vessel from dust, dogs, cats, rain, &c., and obviate the necessity of watching for the milkman, and which shall be so constructed as to sound an alarm when the door is opened; and it consists in the construction and combination of the various parts of the house, as hereinafter more fully described.

A is the house, which is made with a Mansard roof and a cupola, B, upon its top. The sides of the cupola are made of glass to allow the signal C to be seen through them. The signal C may be made to represent a pitcher, and moves up and down through a hole in the floor of the cupola B. The signal C is attached to a yoke or cross-bar, D, the ends of which move up and down in grooves in the sides of the house A. To the yoke or cross-bar D is attached one end of the rope or cord E, which passes over a pulley, F, pivoted to the upper part of the house A, and the other end of which is attached to the edge of the platform G. The other edge of the platform G is hinged to the bottom of the house A. The weight of the yoke or cross-bar D is so adjusted that it will draw the signal C down and at the same time raise the platform G; but when the pitcher or other vessel is placed upon the platform G its weight will lower the platform G and raise the cross-bar or yoke D and signal C so that the milkman can see it. To the house A is attached a bell, H, the hammer of which is attached to the end of the lever I, which is pivoted to the house A, and the lower end of which extends down to the door $a^1$ in the side of the said house. The lower end of the lever I is jointed, so that as the door $a^1$ is swung shut the jointed lower end of the lever may be pushed back by the keeper $a^2$ attached to said door and may drop into said keeper.

By this construction, as the door is opened the lever I is drawn outward, and by its recoil, as it escapes from the keeper $a^2$, it strikes the bell H and sounds an alarm, notifying the people that their milk has been left.

The device is designed to be secured to some suitable support in a conspicuous position.

Having thus described my invention, I claim as new, and desire to secure by Letters Patent—

The signal C placed on a sliding yoke D, and held up by the filled pitcher on platform G, the bell-clapping mechanism, and the cupolaed milk-house A, all combined for the purpose of, first, calling attention by the alarm that the milk has been deposited, and secondly, of exhibiting the corroborating signal thereof, whereby the housekeeper is notified to take charge of said milk.

The above specification of my invention signed by me this 14th day of January, 1871.

ELISHA BELCHER BLAKE.

Witnesses:
 JAMES T. GRAHAM,
 T. B. MOSHER.